Feb. 7, 1950     D. R. DE BOISBLANC     2,496,337
DETONATION METER

Filed Feb. 29, 1944     3 Sheets-Sheet 1

INVENTOR
D. R. de BOISBLANC
BY Hudson Young & Yinger
ATTORNEYS

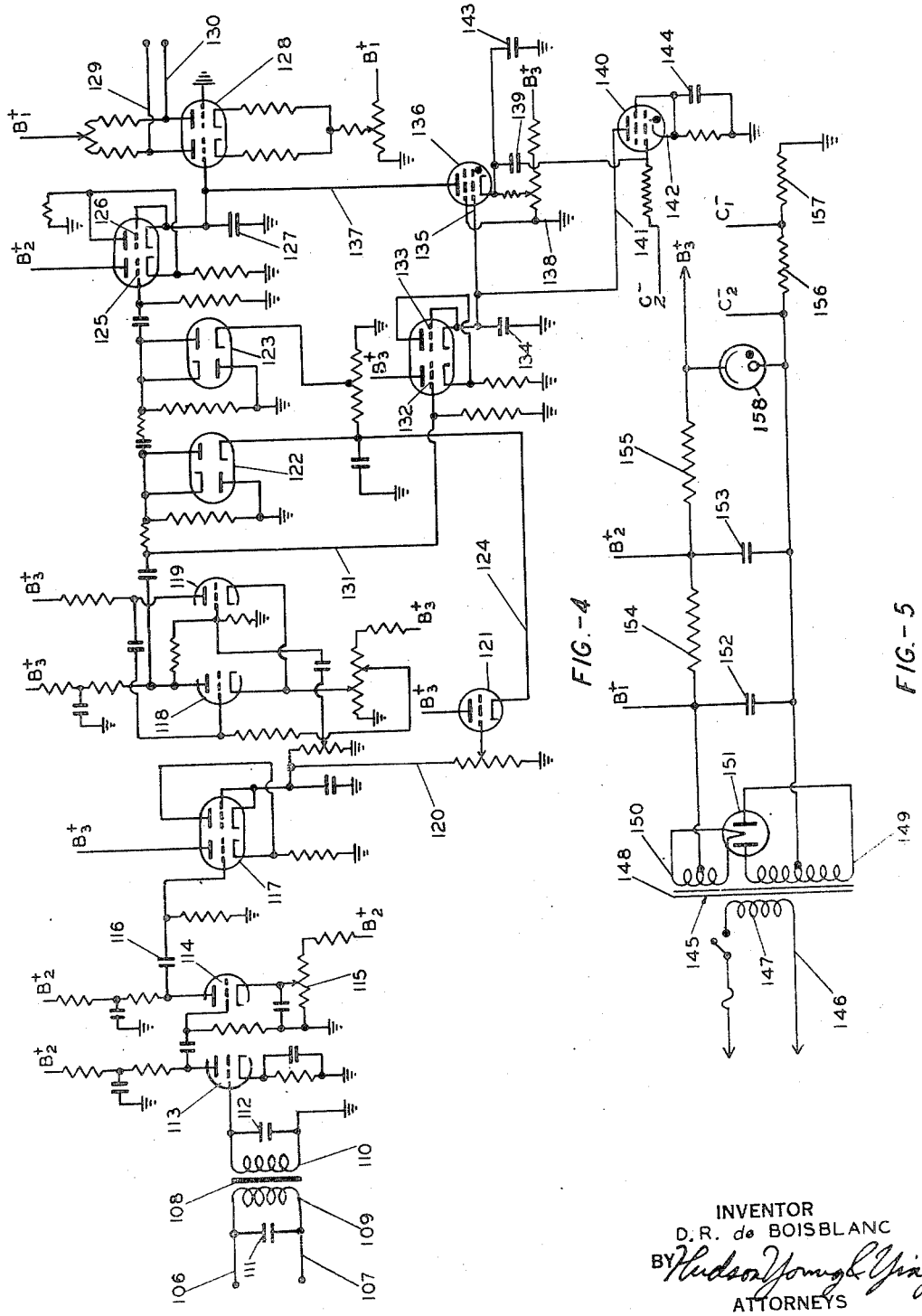

Patented Feb. 7, 1950

2,496,337

UNITED STATES PATENT OFFICE 2,496,337

DETONATION METER

Deslonde R. de Boisblanc, Bartlesville, Okla., assignor to Phillips Petroleum Company, a corporation of Delaware Application February 29, 1944, Serial No. 524,502

16 Claims. (Cl. 73—35)

This invention relates to methods of and means for indicating the intensity of detonation of an internal combustion engine, and it has particular relation to determining the intensity level of detonation, or knocking, by electronic means designed to be in substantial agreement with the results obtained by the human ear, but to determine the intensity level with a higher degree of accuracy and with less skilled operators than possible with the ear.

In the prior art of testing fuels for octane number in a test engine, the knocking was listened for by ear in conjunction with observations on a cathode ray tube of the rate of change of pressure in the cylinder. The "ping" which is heard when the engine is knocking is the sound generated by pressure waves in the cylinder setting up vibrations of between 5,000 and 17,000 cycles per second. It is old to pick up the pressure changes in the cylinder with a magneto-striction type indicator manufactured by the Standard Oil Company of California which generates a voltage substantially proportional to the rate of change of pressure and to observe the 12,000 to 17,000 cycle variations in voltage indicative of detonation by impressing the generated voltage on the leads of a cathode ray oscillograph. The intensity of knocking was still judged by ear, as it proved impossible to measure the rapid fine wave form produced. Attempts to measure the wave form electronically have not proved acceptable to the industry because the octane ratings obtained were not in agreement with the octane ratings of the same fuel made by ear and/or were not reproducible. While the ear is not as sensitive as an electronic device to small changes in knock intensity, it is very accurate as to the approximate knock intensity if the operator is skilled. Because of past ratings of fuel by ear and because the ultimate consumer of fuel judges by ear it is therefore desirable to follow ear rating standards.

The principal object of this invention is to devise a method of and apparatus for indicating the intensity of detonation in a cylinder of an internal combustion engine which indication will be in substantial agreement with that obtained by the human ear of a skilled operator, but which indication will be more accurate than observations made by the ear and which will not require the high skill of an operator trained to rate detonation intensities by ear.

Another object is to provide an electronic device and method which will give the degree of knock intensity in an easily readable manner.

Another object is to provide a detonation meter and method which will give the average value, or sum, of $n$ detonations where $n$ is any predetermined integer.

Another object is to provide a detonation meter and method in which the uniformity of knocks above a threshold value may be observed and the total value of $n$ of such knocks read by a comparatively unskilled operator, the indicating hand being substantially at rest at the time of making the readings.

Another object is to provide in a detonation meter and method of measuring detonations a means and method of counting and adding pulses of variable value in groups of $n$ pulses where $n$ is any predetermined integer.

A further object is to accomplish the above listed objects without introducing any new factors into the prior art of rating of the fuel by ear and do so with a minimum of parts, minimum cost and ease of operation.

Other objects are to provide methods and apparatus useful in signalling and indicating and still further objects and advantages will be apparent to those skilled in the art upon reading the following specification, claims and drawings.

In the drawings:

Figure 4 is a circuit diagram of a portion of the apparatus shown in Figure 2.

Figure 5 is a circuit diagram of one preferred form of the many suitable types of regulated power supply that may be employed to furnish electric current to the circuits of Figures 1 to 4.

Figure 1:
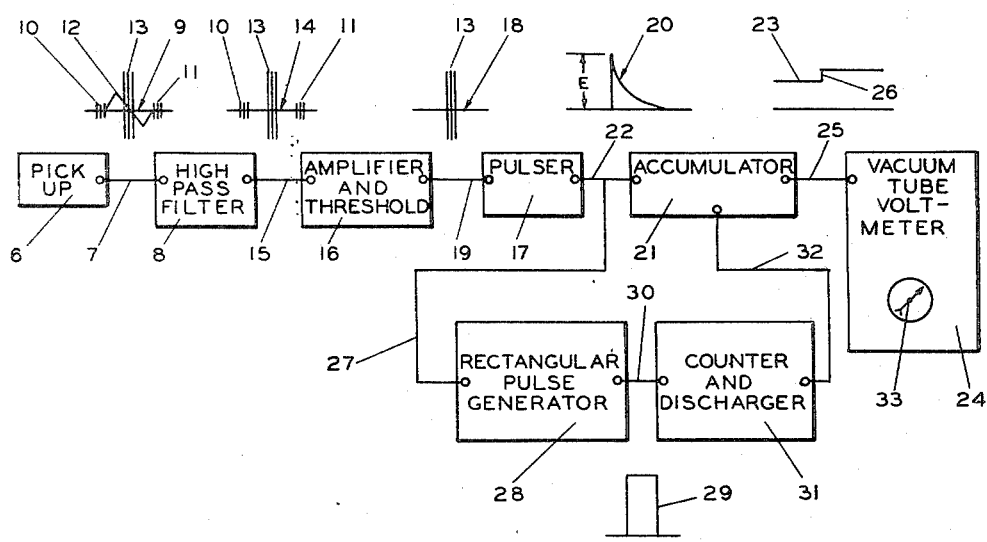
Figure 1 is a diagrammatic view of a detonation meter embodying my invention with the circuit elements arbitrarily separated as to function and with the probable electrical wave form transmitted from one circuit element to the next shown adjacent the respective elements.

In Figure 1 a pickup 6 is connected to a cylinder of an internal combustion engine (not shown). There are several pressure sensitive devices which are able to transform the pressure variations within an engine cylinder to a corresponding electrical voltage. I have been using a very satisfactory magneto-striction type pickup manufactured by the Standard Oil Company of California, the voltage output of which is substantially proportional to the rate of change of pressure, and the same may be used as part 6. The voltage produced by pickup 6 passes through channel 7 to filter 8.

Figure 2:
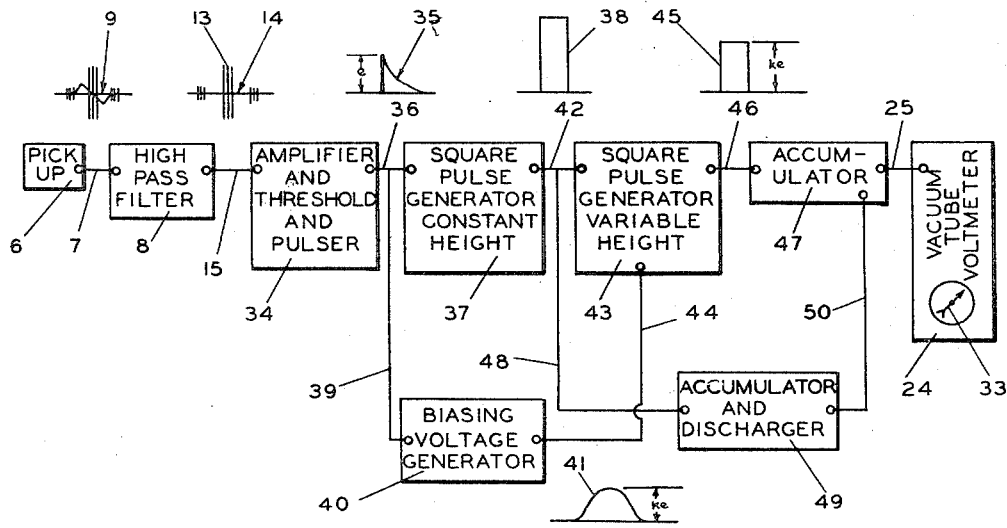
Figure 2 is a similar view of a modified form of detonation meter embodying my invention.
Figure 3:
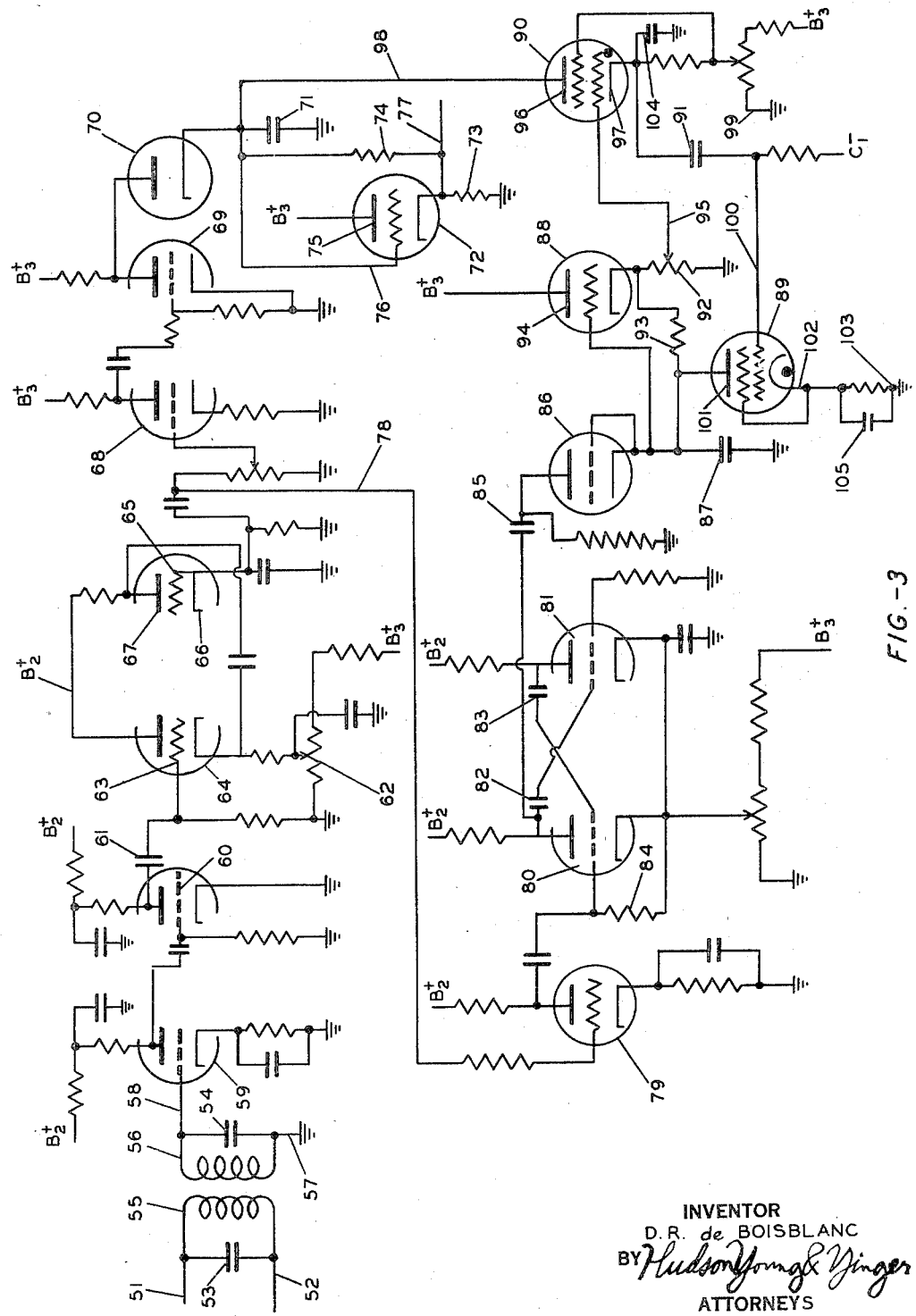
Figure 3 is a circuit diagram of a portion of the apparatus shown in Figure 1.

While channel 7 has been shown diagrammatically as a single line, as are the other channels in Figures 1 and 2, it should be understood that actually two wires, a wire and a ground, or other coupling means such as condensers may be employed by those skilled in the art without invention, and that for an illustrative embodiment of the channels used reference should be made to the wiring diagrams of Figures 3 and 4.

Directly over channel 7 in Figure 1 appears a graph 9 of the voltage generated by the pickup, shown with a zero voltage axis extending in time from left to right on which the amplitude of the voltage from time to time is plotted graphically. High frequency vibration 10 is caused by the clatter of the intake valve closing, high frequency vibration 11 by the exhaust valve closing, and the low frequency wave 12 is caused by the explosion of the fuel and the resulting pressure rise and fall during the power stroke. Superimposed on low frequency wave 12 is high frequency wave 13 caused by the detonation, or knocking, which it is desired to measure. The amplitude of waves 13 denote the violence or intensity of the knock in direct proportion to their height. The great frequency however makes only such a faint blur on a cathode ray oscillograph tube that changes so very rapidly in amplitude and lasts such an instant of time that direct measurement is physically impossible.

The other voltage graphs are made on approximately the same scale as graph 9.

The filter 8 can be a high pass filter because with the usual values most of the energy of waves 10 and 11 lies below about 4000 cycles and that portion above 4000 cycles is much smaller in amplitude and energy than wave 13 which contains high energy bands at about 6500 cycles and between about 12,000 to 17,000 cycles per second, and the wave 12 is of much lower frequency. It is preferred however to use a band pass filter as filter 8 consisting of a tuned transformer coupling to increase the discrimination so that wave 13 will be of much greater amplitude than waves 10 and 11 as shown at 14, which is a graph of the waves transmitted along channel 15 from the filter 8 to the amplifier and threshold 16.

The amplifier and threshold 16 cuts out waves 10 and 11 by means of a negative bias on the grid of the first tube of a pulser 17 and amplifies wave 13. Therefore the wave 18 transmitted over channel 19 from amplifier and threshold 16 to pulser 17 consists entirely of wave 13.

Pulser 17 actuated by wave 13 produces one single pulse 20 for each cycle 12 that has a knock 13 of sufficient intensity to overcome the threshold bias. Each pulse 20 decays exponentially and the pulser returns to its original state after the rest of the particular wave train that excited the pulser has passed but before the next wave train 13 arrives. While in mathematical theory a remainder is left in exponential decay, in fact pulse 20 is soon terminated completely. Pulses 20 have an amplitude E proportional to the maximum amplitude of wave 13.

Pulses 20 are carried from pulser 17 to accumulator 21 by channel 22, and the addition of each pulse causes the voltage 23 transmitted by the accumulator to a voltmeter 24 by channel 25 to increase by an amount 26 proportional to the amplitude of 20 and in turn of 13 and therefore directly proportional to the intensity of the detonation. A vacuum tube type voltmeter is preferred.

Pulses 20 are also carried by channel 27 to a rectangular pulse generator 28 which may be any of several well known types, but preferably is a multivibrator in which the first multivibrator tube is biased negatively beyond cutoff.

For each pulse 20 received through channel 27 rectangular pulse generator 28 produces one rectangular pulse 29 which is transmitted along channel 30 to a counter and discharger 31. Pulses 29 are of constant amplitude, constant duration, and therefore of equal area. They accumulate in a condenser in the counter and when a predetermined number n have accumulated the discharger is actuated to discharge the charges built up by n pulses 20 in accumulator 21, the charges in 21 being drawn off by way of channel 32. The hand 33 of voltmeter 24 then returns to zero and is moved to indicate the sum of amplitudes E of the pulses by each pulse 20. The characteristics of the elements making up the counter and discharger can be selected so that n can be any integer, but for practical purposes n is selected as five or six.

Figure 2 shows a modified form of the invention. Parts 6 to 15, 24 and 33 having been described above will not be further described.

Channel 15 carries the same wave 14 as in Figure 1. The amplifier and threshold and pulser have been placed together in a single box 34 to save space, and produce a pulse 35 similar to pulse 20 for each power cycle of the engine containing a wave train 13 above the threshold value. The division of the circuit into functional elements in boxes like 34 is merely to aid in understanding the invention as sometimes the same element, such as a condenser, may be part of more than one functional element, and of course, the whole circuit operates as a unit in some respects. Pulse 35 has amplitude $e$ proportional to the intensity of the knock and the amplitude of wave 13.

Pulses 35 are transmitted over channel 36 to a square pulse generator of constant height 37 which generates a rectangular pulse 38 of constant height and duration. Pulses 35 are also transmitted over channel 39 to a biasing voltage generator 40, which preferably is an integrator producing pulse 41 of amplitude $Ke$ proportional to the intensity of the knock. For each pulse 35 a single pulse 38 and a single pulse 41 is generated.

Pulses 38 are transmitted over channel 42 to square pulse generator 43 and pulses 41 are transmitted over channel 44 to put a bias on generator 43. Generator 43 generates a variable height rectangular pulse 45 for each pulse 38 it receives. Pulses 45 are of equal duration and their amplitude is proportional to the amplitude of wave 13, pulse 35 and pulse 41 and therefore directly proportional to the intensity of the knock, or detonation. The height $Ke$ of pulses 45 is set by the biasing pulse 41 and generator 43 acts as a clipping circuit to clip pulses 38 to proper height to form pulses 45.

Pulses 45 are transmitted by channel 46 to accumulator 47 where they accumulate in a condenser. The voltage of the condenser rises as shown at 23, 26 in Figure 1, and from 47 the voltage passes along channel 25 to voltmeter 24, 33 all as in Figure 1.

Pulses 38 are transmitted over channel 48 to accumulator and discharger 49 and when n of pulses 38 have accumulated in 49, accumulator 47 is discharged through channel 50. Parts 37, 48, 49, 50 and 47 have the same function in Figure 2 as parts 28, 30, 31, 32 and 21 have in Figure 1.

Figure 3 is a circuit diagram of a portion of the apparatus shown in Figure 1. While other circuit elements could be chosen to carry out the functions of the apparatus of Figure 1, Figure 3 is illustrative of a suitable circuit for performing the desired functions.

In Figure 3 wires 51 and 52 are leads coming from the pick-up 6. Wires 51 and 52 are connected to a tuned transformer coupling consisting of condensers 53 and 54 and the usual transformer coils 55 and 56. Parts 53, 54, 55 and 56 act to form a band pass filter tuned to the frequency of detonation wave 13 and these parts are represented by part 8 in Figure 1.

The lower end of coil 56 is grounded at 57 and the upper part of the coil leads to grid 58 of amplifying tube 59. There are two stages of amplification corresponding to grid 58 and grid 60. Tube 59 is shown as a duo-triode tube such as a 7F7 which is employed to reduce the number of tubes employed. However, grids 58 and 60 may be in separate single triode tubes without departing from the invention and as the only function being accomplished at this point is that of amplification obviously many other amplification circuits will be suggested to those skilled in the art without involving invention. The circuit elements all being obvious in function such as coupling condenser 61, the circuit of Figure 3 will not be described in minute detail. The threshold preventing the passage of waves below a predetermined minimum amplitude is provided by potentiometer 62 which places a negative bias on grid 63 of pulser tube 64. Parts 58 to 63, inclusive and related parts therefor form an amplifier and threshold like 16 of Figure 1.

Tube 64 is shown as another duo-triode tube but grid 65 is tied to cathode 66 to make that portion of the tube form a diode with plate 67. Obviously, in place of all the double tubes shown in Figures 3 and 4, single tubes could be substituted which would merely increase the number of tubes. Parts 63 to 67, inclusive, form a pulser such as 17 of Figure 1. While not shown in Figure 1, I find it desirable to have emplifying tubes 68 and 69 and a rectifying tube 70 in the circuit leading to condenser 71. Condenser 71 is the heart of the accumulator 21 of Figure 1 and rectifier 70 is part of the accumulator because it acts to keep the charges on condenser 71.

As the time between pulses 20 is sometimes several seconds some leakage from condenser 71 would occur which would result in a reduced false voltage being indicated at 33. To prevent this a compensating and regulating circuit embodying tube 72 and resistances 73 and 74 is connected to condenser 71 and may be regarded as part of accumulator 21. Current from plate 75 of tube 72 flows to the cathode and through resistance 73 to ground, the amount of current being governed by the charge in condenser 71 applied to grid 76. This current in 73 creates a voltage at the top of 73 that is slightly greater than the voltage in 71 at all times as when the voltage of 71 increases so does this current, and therefore a very small current flows in condenser 71 through resistance 74 to replace the charge lost by leakage so that the voltage in 71 is substantially constant between pulses 20 and is only raised as at 26 by the next pulse 20 coming in through tube 70. A lead 77 transmits the voltage at the top of 73, which is substantially that of condenser 71 to a voltmeter 24 preferably of the vacuum tube voltmeter type which is not shown in Figure 3 but is shown in Figure 4.

Pulses 20 are transmitted over channel 27, of which wire 78 of Figure 3 is a part to a rectangular pulse generator 28 to be described now. Tube 79 is a conventional triode employed to amplify the pulses, but its chief function is to couple the pulse generator 28 to the pulser 17 without any feedback. Generator 28 consists of a multivibrator formed of two triodes 80 and 81 with the grid of each triode connected to the plate of the other triode through condensers 82 and 83. A negative bias is placed on the grid of triode 80 by resistance 84 biasing the grid beyond cutoff. A positive pulse such as 20 on the grid of triode 80 overcomes this negative bias and regardless of the size of the pulse 20 a uniform pulse 29 is transmitted through condenser 85 through diode rectifier tube 86 to accumulate on condenser 87. The tube 86 is shown as a triode but wiring the grid to the cathode has made it a diode.

The counter and discharger 31 of Figure 1 may consist of tubes 86, 88, 89 and 90 and related parts such as condensers 87 and 91. The pulses 29 add to the charge on condenser 87 and triode tube 88 compensates for any leakage from the condenser 87 the same as tube 72 compensates for leakage from the condenser 71, parts 92, 93 and 94 corresponding to parts 73, 74 and 75 respectively in this mode of compensation. Resistance 92 has an added function over resistance 73, which will now be set forth.

A movable tap 95 is provided to take any portion, or all of the voltage developed across resistance 92, which voltage is substantially the same as that on condenser 87. Tap 95 leads to the control grid of gas filled thyratron tube 90. By moving the tap the number of pulses 29 on condenser 87 necessary to fire the thyratron tube 90, that is to make tube 90 conductive of current from plate 96 to cathode 97, may be varied. The number of pulses on condenser 87 to fire tube 90 is referred to as $n$, and is usually set at 5 or 6, but may be any positive integer from 1 to any desired upper number, very high numbers requiring more exact values of the circuit characteristics than lower numbers.

Plate 96 leads to discharging wire 98 and when tube 90 fires, or discharges, the charge on condenser 71 drains off through 98, 96, 97 to ground 99, a portion of the charge surging into condenser 91 which makes grid 100 go positive enough to fire gas filled thyratron tube 89. When tube 89 becomes conducting the charge on condenser 87 discharges through plate 101 to cathode 102 and then to the ground at 103.

In Figure 3 the heating filaments for the cathodes are not shown to reduce the complexity of the drawings, but of course each cathode has them. Wires ending in $B_2^+$, $B_3^+$ receive suitable positive voltages and the wire marked $C_1^-$ receives a suitale negative voltage relative to the ground from a power supply, such as shown in Figure 5.

Condenser 104 in Figure 3 extinguishes tube 90, that is, makes the tube non-conducting from plate to cathode when the charge from condenser 71 has gone to ground thus preparing condenser 71 to receive and hold the next pulse 20. Condenser 105 performs the same function for tube 89 and condenser 87.

Figure 4 shows the modified form of the detonation meter shown in diagrammatic form in Figure 2. While Figs. 1 and 3 are the preferred form, Figures 2 and 4 have obvious advantages making them a valuable modification.

In Figure 4 wires 106 and 107 are leads coming from the pick-up and powdered iron core 108, coils 109, 110 and condensers 111 and 112 form the filter 8 of Figure 2 being a tuned transformer band pass filter and coupling. Triodes 113 and 114 furnish two stages of amplification and potentiometer 115 provides a threshold bias setting a lower limit in amplitude as to waves that will pass to coupling condenser 116 and the rest of the circuit. Tube 117 containing a triode and a diode forms the pulser included in 34 of Figure 2 with the amplifier and threshold.

The square pulse generator of constant height 37 consists of triodes 118 and 119 and related circuit elements which form a multivibrator generating pulses 38.

Pulses 35 from pulser 117 also are transmitted down wire 120 to the grid of a triode 121 which triode acts as an amplifier and modulates one diode of each duo-diode tube 122 and 123 through wire 124 and related circuit elements for purposes to be set forth below.

Tubes 122 and 123 and related parts form the square pulse generator of variable height 43 of Figure 2. Tube 122 clips pulse 38 coarsely and tube 123 does the fine clipping that produces pulse 45.

The accumulator 47 comprises a buffer triode 125, a rectifying and integrating triode 126 and an accumulating condenser 127. The voltage of the charge on condenser 127 is measured by voltmeter 24 shown as a vacuum tube voltmeter having duo-triode tube 128, leads 129 and 130 to the indicating instrument 33 and related circuit elements.

Wire 131 transmits pulses 38 of constant amplitude from tube 118 of the generator 37 to the accumulator and discharger 49. Accumulator 49 comprises a buffer triode 132, a rectifier and integrating triode 133 and an accumulating condenser 134. Pulses 38 accumulate on condenser 134. The similarity of parts 125, 126, 127 and 132, 133 and 134, respectively, is obvious.

The voltage on condenser 134 is transmitted to the grid of gas filled thyratron 136 and when the proper value is reached fires tube 136 and discharges condenser 127 through plate lead 137 and cathode lead 138 to ground. This discharge sends a pulse through condenser 139 to the grid of a second gas filled thyratron tube 140 and fires tube 140 which discharges condenser 134 to ground through plate lead 141 and cathode lead 142. Condensers 143 and 144 act as condensers 104 and 105 of Figure 3 to bring their respective thyratron tubes 136 and 140 back to non-conducting state after their discharge.

No compensating tubes like tubes 72 and 88 of Figure 3 are shown because these compensating tubes and circuits are not essential in either Figure 3 or 4. They may be added to Figure 4 by one skilled in the art after studying Figure 3 if their use is deemed desirable, and when the time between knocks is very long their use is desirable.

In Figure 5 a source of power generally designated 145 is shown. However any power source, such as radio A, B and C batteries could be used instead, and Figure 5 is merely presented to make the disclosure very complete.

Power source 145 is the type now used. A 110 volt 60 cycle power line 146, or any other suitable alternating current source is provided with the usual switches, fuses and other elements, and transformer coil 147. The rest of the transformer consists of iron core 148 and center tapped coils 149 and 150. The usual duo-diode rectifier tube 151 is connected as shown to coils 149 and 150 and may be the type 80 tube. Condensers 152 and 153 bypass the sine wave ripple and resistances 154, 155, 156 and 157 have different voltages developed across them and act as voltage dividers. Wire ends marked $B_1^+$, $B_2^+$, $B_3^+$, $C_1^-$ and $C_2^-$ supply different voltages positive or negative to ground as indicated by the + or − signs, and these voltages are applied respectively to like designated wire ends in Figures 3 and 4. Tube 158 is a voltage regulator tube of any type and may be a gas filled tube known as VR 150.

The power source for the cathode heater filaments of Figures 3 and 4 (not shown) is also not shown as any of the usual radio tube filament heater power sources may be employed to develop the voltages designated by the vacuum tube manufacturer.

Operation

In Figures 1 and 3 pick-up 6, 51 and 52 generates voltages substantially directly proportional to the rate of change of pressure in the cylinder, and plotted on a time axis these voltages form a wave 9 having valve clatter 10 and 11, power stroke pressure changes 12, and if conditions are right, every second or two the wave will contain detonation wave 13, which is caused by a knock. The method of measuring wave 13 only, and the apparatus for doing so are part of my invention.

Wave 9 is passed through filter 8, 53, 54, 55 and 56 which substantially completely eliminates wave 12, passes wave 13 and at least partially suppresses waves 10 and 11 so that wave 13 is the only wave left of any considerable amplitude. This is shown as wave 14.

Wave 14 is passed through an amplifier and threshold 16, 59, 60 and 62 which amplifies wave 13 and cuts out waves 10, 11 and 12 completely. The isolated wave 13 is shown at 18 in Figure 1.

Wave 18 is passed into pulser 17, 63 and 65 which generates a pulse 20 of amplitude E directly proportional to the highest amplitude of wave 13. This pulse 20 is amplified at 68 and 69 and passes through rectifier 70 to accumulate in accumulator condenser 21, 71.

Pulse 20 also passes into rectangular pulse generator 28, 80, 81, 82, 83 and 84 which generates for each pulse 20 of any amplitude a constant height and duration pulse 29.

Pulse 29 passes through rectifier 86 to accumulate in condenser 87 of counter and discharger 31. Depending on the setting of potentiometer 92, 95 a number $n$ of pulses 29 raise the voltage of 87, 93, 95 to the point where thyratron 90 suddenly becomes conducting. Thyratron 90 discharges condenser 71 and fires thyratron 89 which discharges condenser 87. Surges in condensers 104 and 105 make the thyratrons 90 and 89 respectively non-conducting and return the system to its original condition.

Vacuum tube voltmeter 24, 33 and 77 indicates the voltage of condenser 71, and as the capacity is known, and as the voltage rise is proportional to the intensity of the knock, the dial 24 may be calibrated in knock intensity values. However, any other desired calibration or division of the dial may be made. In practice when testing the octane number of a gasoline the amounts of fuel and air are varied (not shown) until knocking results. The knocks do not occur every power stroke, but instead may be one every twenty or so power strokes more or less and may be a second or two or even more apart. The hand 33 jumps to a new position with each knock above the threshold value and holds its position long enough for rapid reading. When the $n$th knock arrives the hand 33 jumps back to zero.

The operation of Figures 2 and 4 is similar to the operation of Figures 1 and 3 but differs in the handling of pulse 35 of Figure 2 which is similar to pulse 20 of Figure 1.

Pulse 35 passes into a square pulse generator 37, 118, 119 which generates a constant height and duration pulse 38 for each pulse 35 received regardless of size of pulse 35.

The constant pulse 38 is clipped to amplitude proportional to 35 and 13 in square pulse generator 43, 122, 123, forming pulses 45.

Pulses 45 are accumulated in condenser 127 of accumulator 47, 125, 126 and 127, and the voltage of 127 is indicated by vacuum tube voltmeter 24, 33, 128, 129 and 130 the same as in Figures 1 and 3.

In Figures 2 and 4 pulses 35 actuate biasing voltage generator 40, 121 to modulate tubes 122 and 123 to regulate the height of pulses 45 so that they are proportional to the intensity of knock wave 13.

Uniform pulses 38 are accumulated on condenser 134 of accumulator and discharger 49, 132, 133, 134 and 136, and when $n$ have accumulated thyratron 136 is fired discharging condenser 127 and firing thyratron 140 which discharges condenser 134. Condensers 143 and 144 restore the system to its original condition. The action of the parts described in this paragraph is similar to the action of parts 89, 90, 104 and 105 of Figure 3.

The operation of Figure 5 is so well understood as to need no further description, it being described above.

As pointed out above many changes of circuits following the usual circuits old in the art, and many substitutions of different tubes, conventional elements or units having the same function, may be done by those skilled in the art without departing from my invention, the scope of which is set forth in the following claims.

Having described my invention, I claim:

1. A method of indicating the knock level in a cylinder of an internal combustion engine comprising the steps of generating a first series of electrical pulses the amplitudes of which are proportional to the rate of change of pressure in the cylinder, eliminating from said pulses all frequencies substantially lower than the frequencies of detonation and eliminating all of said pulses below a predetermined minimum amplitude to form a second series of electrical wave train pulses, generating for each pulse of said second series a third series single pulse proportional to the amplitude of said pulse of said second series, generating for each pulse of said second series a fourth series single pulse of uniform value, accumulating said third series pulses and indicating the sum of said accumulated third series pulses, accumulating $n$ pulses of said fourth series pulses where $n$ is any predetermined integer and upon the accumulation of $n$ pulses of said fourth series pulses discharging the accumulation of said third and fourth series pulses whereby this method may be repeated.

2. A method of indicating the knock level in a cylinder of an internal combustion engine comprising the steps of generating a first series of pulses synchronous with, proportional in amplitude to the maximum rate of change of pressure in the cylinder, and of substantially the same frequency as the detonation pressure waves in said cylinder, eliminating all of said pulses below a predetermined minimum amplitude to form a second series of pulses, generating for each pulse of said second series a third series single pulse proportional to the amplitude of said pulse of said second series, generating for each pulse of said second series a fourth series single pulse of uniform value, accumulating said third series pulses and indicating the sum of said accumulated third series pulses, accumulating $n$ pulses of said fourth series pulses where $n$ is any predetermined integer and upon the accumulation of $n$ pulses of said fourth series pulses discharging the accumulation of said third and fourth series pulses whereby this method may be repeated.

3. A method of indicating the knock level in a cylinder of an internal combustion engine comprising the steps of generating a first series of pulses synchronous with, proportional in amplitude to the maximum rate of change of pressure in the cylinder, and of substantially the same frequency as the detonation pressure waves in said cylinder, eliminating all of said pulses below a predetermined minimum amplitude to form a second series of pulses, generating for each pulse of said second series a third series single pulse proportional to the amplitude of said pulse of said second series, accumulating said third series pulses, indicating the sum of said third series pulses, counting said third series pulses and when $n$ third series pulses are accumulated where $n$ is any predetermined integer discharging the accumulated third series pulses.

4. The method of measuring the knock intensity during periods of detonation in the cycles of an internal combustion engine cylinder, comprising the steps of continuously picking up a signal during all cycles in synchronism therewith, the signal containing first elements which are a function of knock intensity during periods of detonation, the signal also containing other elements, clearing the signal of substantially all elements except the first elements, clearing the signal of all the first elements below a predetermined fixed value, accumulating $n$ cycles of said remaining first elements where $n$ is any predetermined fixed finite integer and indicating a function of said $n$ cycles of said first elements.

5. A detonation meter for indicating the intensity of knocking synchronous with the power stroke cycle in the cycles of an internal combustion engine cylinder, comprising in combination pick-up means for continuously picking up signals proportional to the intensity of knocking during the power stroke cycle, and spurious signals during other cycles, means for cutting out the signals picked up during said other cycles, means for cutting out signals during the power cycle below a predetermined value, means for accumulating a series of $n$ of the remaining power stroke cycle signals where $n$ is any predetermined integer, means for discharging said accumulation when $n$ of said power stroke cycle signals have been accumulated.

6. The method of measuring the knock intensity of a cylinder of an internal combustion engine comprising picking up signals for each combustion cycle containing elements proportional to the knock intensity in said cylinder, generating a rectangular pulse for each combustion cycle said rectangular pulses being of constant amplitude, integrating said signals to form biasing pulses of amplitude proportional to the knock intensity, clipping said rectangular pulses to the same amplitude as their respective biasing pulses, accumulating $n$ of said clipped rectangular pulses where $n$ is a predetermined integer, and indicating the value of said clipped rectangular pulses.

7. The method of measuring the knock intensity of a cylinder of an internal combustion engine comprising picking up signals for each combustion cycle containing elements proportional to the knock intensity in said cylinder, generating a rectangular pulse for each combustion cycle said rectangular pulses being of constant amplitude, integrating said signals to form biasing pulses of amplitude proportional to the knock intensity, clipping said rectangular pulses to the same amplitude as their respective biasing pulses, and indicating the value of said clipped rectangular pulses.

8. A detonation indicator for a cylinder of an internal combustion engine comprising in combination a pick-up for generating voltages substantially directly proportional to the rate of pressure change in said cylinder, a filter connected to said pick-up for cutting out frequencies in said generated voltage of less than 12,000 cycles per second, amplifier and threshold means connected to said filter for amplifying said generated voltages of more than 12,000 cycles per second which have more than a predetermined amplitude, a pulser connected to said amplifier for forming single pulses corresponding in time with and proportional in amplitude to said generated voltages of more than predetermined amplitude, an accumulator connected to said pulser for accumulating said pulses, a uniform pulse generator connected to said pulser for generating a uniform pulse for each of said single pulses, a counter connected to said uniform pulse generator for counting $n$ pulses where $n$ is a predetermined integer and then discharging said accumulator and means indicating the sum of the amplitudes of the single pulses in said accumulator.

9. A detonation indicator for a cylinder of an internal combustion engine comprising in combination a pick-up, a filter connected to said pick-up, amplifier and threshold means connected to said filter, a pulser connected to said amplifier, an accumulator connected to said pulser, a uniform pulse generator connected to said pulser, a counter connected to said uniform pulse generator for discharging said accumulator upon the occurrence of $n$ pulses and an indicator for indicating the electrical state of said accumulator whereby the knock level of said cylinder is measured.

10. A detonation indicator for a cylinder of an internal combustion engine comprising in combination a pick-up for generating voltages substantially directly proportional to the rate of pressure change in said cylinder, a filter connected to said pick-up for cutting out frequencies in said generated voltage of less than 12,000 cycles per second, amplifier and threshold means connected to said filter for amplifying said generated voltages of more than 12,000 cycles per second which have more than a predetermined amplitude, a rectangular pulse generator connected to said amplifier for generating rectangular pulses of constant amplitude and duration spaced in time with said generated voltages, an integrator connected to said amplifier for integrating said generated voltages into single pulses proportional in amplitude to said amplified voltages, a clipper connected to said rectangular pulse generator for receiving said rectangular pulses, said clipper being connected to said integrator for receiving said single pulses as bias and clipping said rectangular pulses to an amplitude proportional to said amplified voltages according to said bias, an accumulator connected to said clipper for receiving said clipped rectangular pulses, a counter connected to said rectangular pulse generator for counting $n$ pulses where $n$ is a predetermined integer, said counter being connected to said accumulator to discharge the accumulator upon receiving $n$ pulses, and means for indicating the electrical state of said accumulator whereby the average level of detonation in said cylinder may be determined.

11. A detonation indicator for a cylinder of an internal combustion engine comprising in combination a pick-up, a filter connected to said pick-up, amplifier and threshold means connected to said filter, a rectangular pulse generator connected to said amplifier, an integrator connected to said amplifier, a clipper connected to said rectangular pulse generator, said clipper being connected to said integrator, an accumulator connected to said clipper, a counter connected to said rectangular pulse generator, said counter being connected to said accumulator, and means for indicating the electrical state of said accumulator whereby the average level of detonation in said cylinder may be determined.

12. In a detonation level indicator for internal combustion engines, a means for determining the sum of $n$ electrical pulses of variable amplitude coming from a pulser when $n$ is any predetermined integer, comprising in combination a parallel channel network connecting said pulser and a pulse accumulator, a uniform pulse generator, a counter and a discharger in one branch of said parallel channel, said counter operating said discharger to discharge said accumulator when $n$ uniform pulses are generated, and means indicating the sum of said variable pulses in said pulse accumulator.

13. In a detonation indicator in which variable pulses are generated by detonation in an internal combustion engine, means to indicate a parameter of said detonation comprising means to accumulate and integrate said variable pulses, a second pulse generator generating a uniform pulse for each variable pulse, means to count the uniform pulses, means to discharge both the uniform and the variable pulse accumulator when the pulses number $n$, where $n$ is any predetermined finite integer, and means to indicate the sum of the variable pulses.

14. In a sub-combination as disclosed, means for converting vibrational and pressure waves containing desired and undesired components into electrical signal currents, a high pass filter circuit fed by said means, a vacuum tube amplifier having an input and an output circuit connected to said filter circuit at its input circuit, and means in said input circuit providing an adjustable fixed operating threshold whereby signal currents of a magnitude below selectable fixed desired values do not pass to the output circuit of the amplifier.

15. The method of indicating the detonation intensity level of a cylinder of an internal combustion engine comprising generating an electrical pulse proportional to the maximum rate of change of pressure in the cylinder due to each detonation, discarding all of said pulses of less than predetermined amplitude, adding the amplitudes of $n$ of said pulses of sufficient amplitude where $n$ is any predetermined finite integer and indicating the sum of $n$ of said added pulses.

16. The method of indicating the detonation intensity level of a cylinder of an internal combustion engine comprising generating an electrical pulse proportional to the maximum rate of change of pressure in the cylinder due to each detonation, adding the amplitudes of $n$ of said pulses where $n$ is any predetermined finite integer and indicating the sum of $n$ of said added pulses.

DESLONDE R. DE BOISBLANC.

REFERENCES CITED

The following references are of record in the file of this patent:

UNITED STATES PATENTS

| Number | Name | Date |
| --- | --- | --- |
| 1,424,361 | Frankforter | Aug. 1, 1922 |
| 1,462,109 | Hopkins | July 17, 1923 |
| 2,009,997 | Germond | Aug. 6, 1935 |
| 2,110,015 | Fitz Gerald | Mar. 1, 1938 |
| 2,113,011 | White | Apr. 5, 1938 |
| 2,249,420 | Engbert et al. | July 15, 1941 |
| 2,337,522 | Eldredge | Dec. 21, 1943 |
| 2,340,714 | Traver et al. | Feb. 1, 1944 |
| 2,416,614 | Crossley et al. | Feb. 25, 1947 |